(12) United States Patent
Kim (10) Patent No.: US 10,717,591 B2
(45) Date of Patent: Jul. 21, 2020

(54) CONTAINER FOR ICECREAM (71) Applicant: INTELLECTUAL DISCOVERY CO., LTD., Seoul (KR)

(72) Inventor: Byung Yong Kim, Seoul (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 0 days.

(21) Appl. No.: 15/744,269

(22) PCT Filed: Jul. 15, 2016

(86) PCT No.: PCT/KR2016/007740
§ 371 (c)(1),
(2) Date: Jan. 12, 2018

(87) PCT Pub. No.: WO2017/010842
PCT Pub. Date: Jan. 19, 2017

(65) Prior Publication Data
US 2018/0208391 A1 Jul. 26, 2018

(30) Foreign Application Priority Data

Jul. 16, 2015 (KR) .................. 10-2015-0101159
Jan. 28, 2016 (KR) .................. 10-2016-0010731

(51) Int. Cl.
*B65D 85/78* (2006.01)
*A23G 3/00* (2006.01)
(Continued)

(52) U.S. Cl.
CPC .............. *B65D 85/78* (2013.01); *A23G 3/00* (2013.01); *A23G 9/503* (2013.01); *B65D 11/02* (2013.01); *B65D 1/0223* (2013.01)

(58) Field of Classification Search
CPC ... F25C 1/243; F25C 1/24; F25C 1/22; A23G 9/503; A23G 9/221; B65D 85/78; B65D 11/02
(Continued)

(56) References Cited

U.S. PATENT DOCUMENTS 4,244,470 A * 1/1981 Burnham ............... A23G 9/503
 206/525
D272,128 S * 1/1984 Parmentier .................. D15/90
(Continued)

FOREIGN PATENT DOCUMENTS

CN       2451521 Y     10/2001
CN     201057773 Y      5/2008
(Continued)

OTHER PUBLICATIONS

International Search Report for PCT/KR2016/007740 dated Oct. 19, 2016 [PCT/ISA/210].

*Primary Examiner* — Steven A. Reynolds
(74) *Attorney, Agent, or Firm* — Sughrue Mion, PLLC (57) ABSTRACT

A container for ice cream according to an exemplary embodiment of the present disclosure is an ice cream container having an inner space, in which ice cream is stored, formed by coupling between a container part and a cap part, and the container for ice cream includes: a container part which is formed of a material obtained by mixing polyethylene terephthalate (PET) and silicone resin in order to endow the same with elasticity and has a first coupling flange formed on the periphery thereof and a first grip portion formed on one side thereof; and a cap part which has a second coupling flange corresponding to the first coupling flange and has a second grip portion corresponding to the first grip portion and thus corresponds to the container part.

4 Claims, 7 Drawing Sheets

(51) Int. Cl.
  *B65D 8/00* (2006.01)
  *A23G 9/50* (2006.01)
  *B65D 1/02* (2006.01)

(58) Field of Classification Search
  USPC .................. 220/4.25; 206/822; D9/428, 426; 249/92, 91
  See application file for complete search history.

(56) References Cited

U.S. PATENT DOCUMENTS

| | | | | |
|---|---|---|---|---|
| 5,269,430 | A | * | 12/1993 | Schlaupitz ........... B65D 43/162 206/551 |
| D368,414 | S | * | 4/1996 | VanHalteren ................. D7/675 |
| 5,618,463 | A | * | 4/1997 | Rindler ................. A23G 9/221 249/91 |
| 6,070,723 | A | * | 6/2000 | Lewis ................. B65D 75/322 206/335 |
| 6,857,277 | B2 | * | 2/2005 | Somura ..................... F25C 1/18 249/92 |
| 8,881,938 | B2 | * | 11/2014 | Brannock ............. B65D 47/06 215/387 |
| 9,303,910 | B2 | * | 4/2016 | Villalobos ................ F25C 1/22 |
| 2007/0107447 | A1 | * | 5/2007 | Langlotz ................ F25C 1/243 62/66 |
| 2015/0000953 | A1 | * | 1/2015 | Kim ....................... H01B 13/24 174/103 |

FOREIGN PATENT DOCUMENTS

| | | |
|---|---|---|
| CN | 204150338 U | 2/2015 |
| JP | 61-35190 | 3/1986 |
| JP | 7-33893 | 6/1995 |
| JP | 2010-030660 A | 2/2010 |
| JP | 2015-93674 A | 5/2015 |
| KR | 20-0259147 Y1 | 12/2001 |
| KR | 10-2003-0040433 A | 5/2003 |
| KR | 20-0364895 Y1 | 10/2004 |
| KR | 20-2014-0001322 U | 3/2014 |
| KR | 1020140094311 A | 7/2014 |
| KR | 20-2014-0005155 U | 10/2014 |

\* cited by examiner

CONTAINER FOR ICECREAM

TECHNICAL FIELD

The present disclosure relates to a container for ice cream and more particularly, to a container for ice cream in which spherical ice cream can maintain its shape and from which ice cream can be more easily pulled out.

BACKGROUND

Ice cream can be roughly classified into bar-shaped ice cream with a stick and ice cream to be scooped into a cone or container with a scoop or spoon and eaten with a spoon. The bar-shaped ice cream with a stick can be individually wrapped and stored and can be manufactured into various shapes, whereas most of the ice cream to be eaten with a spoon is contained in a cup or ice cream bucket and served using a scoop as needed for use.

In general, the bar-shaped ice cream with a stick is manufactured by inserting a stick into an ice cream mold, pouring a liquid ice cream material into the ice cream mold, freezing the ice cream material and then individually wrapping the ice cream and the ice cream to be eaten with a spoon is manufactured by pouring a liquid ice cream material into each capacity container, sealing an upper part of the container and freezing the ice cream material.

Departing from the methods for manufacturing such general and simple forms of ice cream, a silicone container for packaging ice cream in a small portion for home use is designed to personally manufacture ice cream in various shapes to suit individual tastes.

According to a mass production method of ice cream, it is difficult to produce and package ice cream in a small portion in various shapes to suit individual uses. For example, as for ice cream to be eaten with a spoon, a scoop or spatula is used to scoop ice cream as much as needed, and in this case, a portion of the ice cream in contact with the scoop or spatula often melts and the scoop or spatula is stored at a higher temperature than the ice cream in order to more easily scoop the ice cream, and, thus, frequent exposures to air may deteriorate unique texture and flavor of the ice cream.

Currently available ice cream containers and molds for small production or home use have the advantage of being enable ice cream to be made into various shapes such as stars, circles, triangles, and the like, but are not suitable for mass production, and they need to be washed and sanitarily kept in order to reuse them after use and are not suitable for ice cream shops where a large amount of ice cream is used.

The matters described above as the background art are provided only for improving understanding of the background of the present disclosure, but shall not be construed as belonging to the conventional art already known to those skilled in the art.

DISCLOSURE OF THE INVENTION

Problems to Be Solved By the Invention

The present disclosure is conceived to solve the above-described problem and provides a container for ice cream which is capable of individually packaging spherical ice cream and providing a user with ice cream without any change in its spherical shape.

Means for Solving the Problems

As a means for solving the above-described technical problem, a container for ice cream according to an aspect of the present disclosure is an ice cream container having an inner space, in which ice cream can be stored, formed by coupling between a container part and a cap part, and the ice cream container includes: a container part which is formed of a material obtained by mixing polyethylene terephthalate (PET) and silicone resin in order to endow the same with elasticity and has a first coupling flange formed on the periphery thereof and a first grip portion formed on one side thereof; and a cap part which has a second coupling flange corresponding to the first coupling flange and has a second grip portion corresponding to the first grip portion and thus corresponds to the container part.

The first grip portion and the second grip portion may include a first grip hole and a second grip hole, respectively, to form a through hole by coupling between the container part and the cap part.

Each of the container part and the cap part may have a hemispherical shape in order for the space formed by coupling between the container part and the cap part to have a spherical shape.

A ratio of horizontal diameter to vertical diameter of the space formed by coupling between the container part and the cap part may be from 1.005 to 1.080.

The material may contain polyethylene terephthalate in the amount of from 65 wt % to 95 wt % and silicone resin in the amount of from 5 wt % to 35 wt %.

The material may have a thickness of from 0.3 mm to 0.6 mm.

Effects of the Invention

A container for ice cream according to the present disclosure has the following effects.

Firstly, it is easy to freeze, transport, and store ice cream and it is possible to easily separate ice cream and also possible to provide a customer with ice cream without any change in shape.

Secondly, it is possible to shorten the quenching time of ice cream and thus possible to suppress crystallization caused by moisture contained in the ice cream.

Thirdly, a separate scoop or spoon is not used, and, thus, it is possible to sanitarily provide ice cream.

Fourthly, ice cream can be provided in a separate package, and, thus, the container for ice cream can be easily used in ice cream shops.

MODE FOR CARRYING OUT THE INVENTION

Hereinafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, it is to be understood that the term "comprises or includes" and/or "comprising or including" used in the document means that one or more other components, steps, operation and/or existence or addition of elements are not excluded in addition to the described components, steps, operation and/or elements unless context dictates otherwise and is not intended to preclude the possibility that one or more other features, numbers, steps, operations, components, parts, or combinations thereof may exist or may be added.

Hereinafter, a container for ice cream according to exemplary embodiments of the present disclosure will be described with reference to the accompanying drawings.

Figure 1:
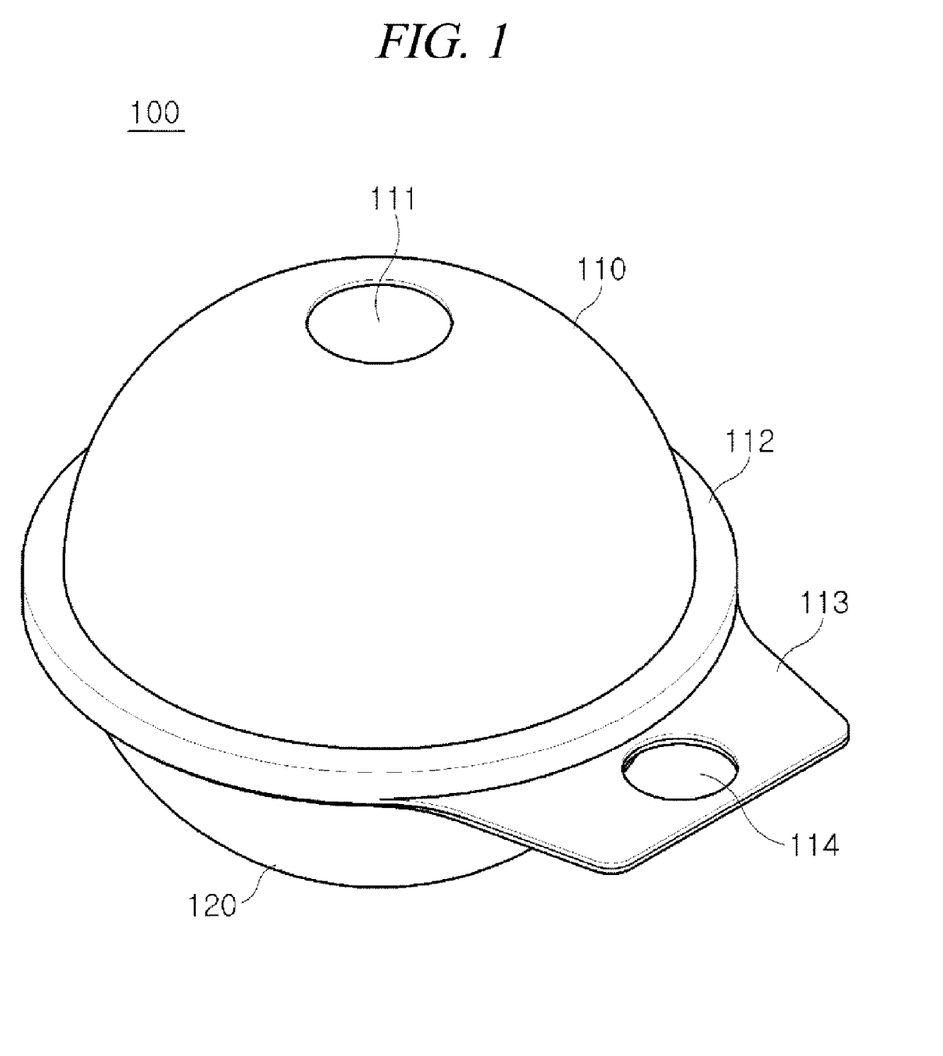
FIG. 1 is a perspective view of a container for ice cream according to an exemplary embodiment of the present disclosure.
Figure 2:
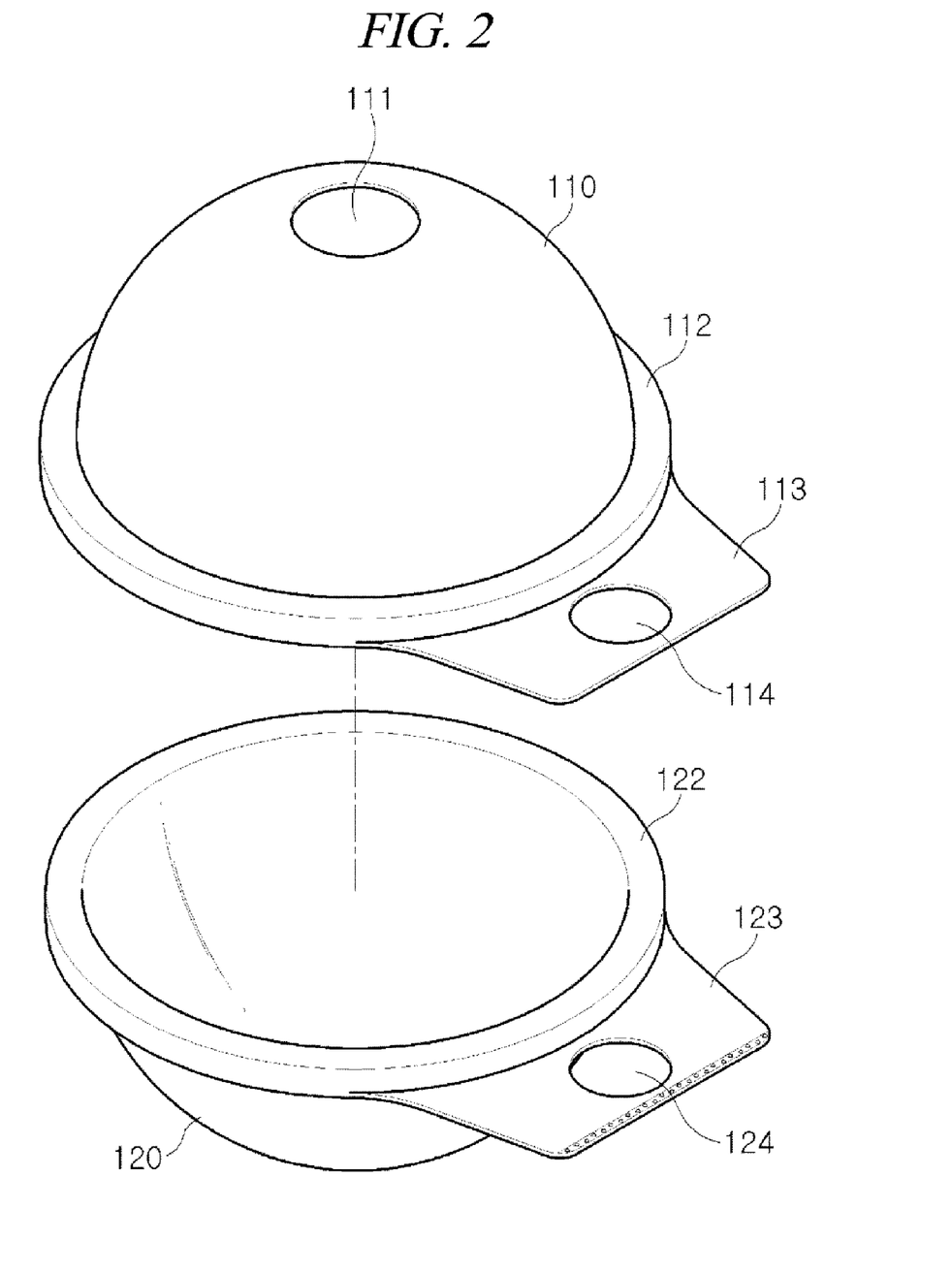
FIG. 2 is an exploded perspective view of the container for ice cream according to an exemplary embodiment of the present disclosure.
Figure 3:
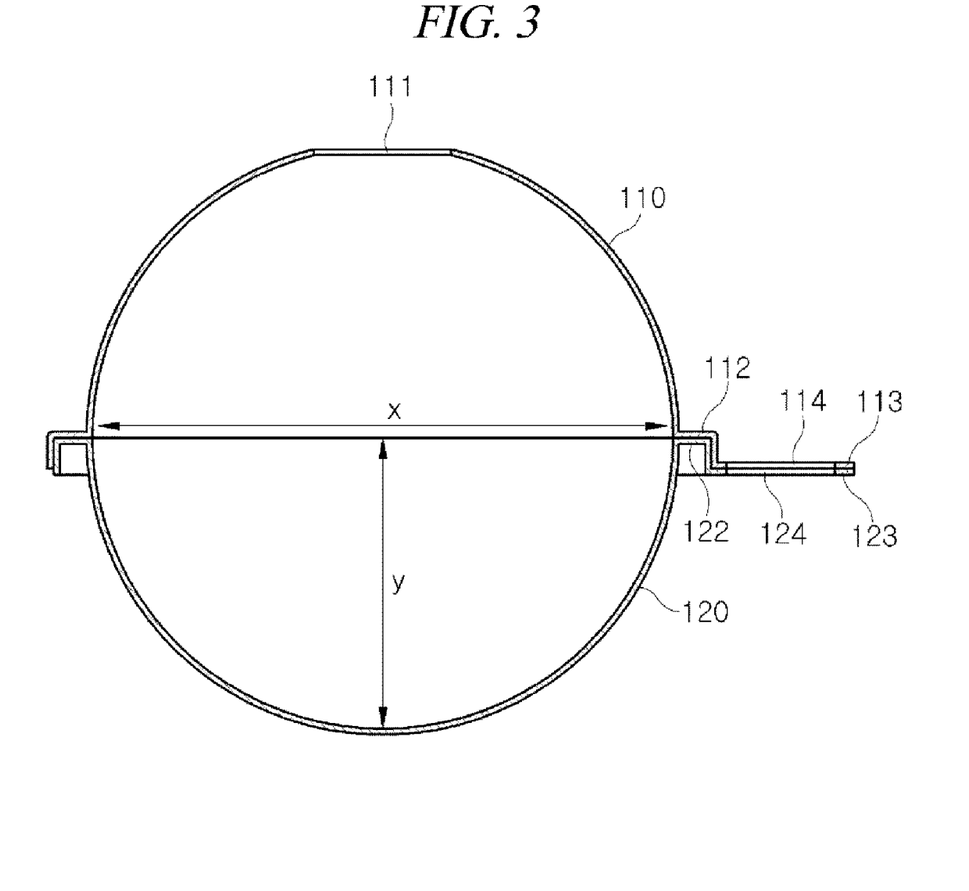
FIG. 3 is an exploded perspective view of the container for ice cream according to an exemplary embodiment of the present disclosure.

FIG. 1 is a perspective view of a container for ice cream according to an exemplary embodiment of the present disclosure, FIG. 2 is an exploded perspective view of the container for ice cream according to an exemplary embodiment of the present disclosure, and FIG. 3 is an exploded perspective view of the container for ice cream according to an exemplary embodiment of the present disclosure. As illustrated in FIG. 1 to FIG. 3, an ice cream container 100 according to an exemplary embodiment of the present disclosure may roughly include a cap part 110 and a container part 120. The cap part 110 and the container part 120 are described as denoted by different reference numerals, respectively, but may be symmetrically formed and may be specified depending on whether or not an ice cream inlet 111 is formed in the cap part 110. The cap part 110 and the container part 120 may include a first coupling flange 112 and a second coupling flange 122 on their peripheries, respectively, in order to be coupled to each other in a stationary fit manner. The cap part 110 and the container part 120 may be coupled by coupling between the first coupling flange 112 and the second coupling flange 122, and a storage space for ice cream may be formed within the ice cream container 100 by coupling between the first coupling flange 112 and the second coupling flange 122.

This space forms a shape of ice cream when the ice cream is separated from the container 100. In an exemplary embodiment of the present disclosure, the shape is represented by a spherical shape but can be changed to various shapes. The shape can be implemented as a complete spherical shape and can also be implemented as a polyhedron similar to a spherical shape. Desirably, ice cream may have a spherical shape in order for the ice cream to have a smooth shape when provided to consumers. Herein, the spherical shape includes not only a complete spherical shape but also polyhedrons or ellipsoids similar to a spherical shape.

Further, referring to FIG. 3, desirably, a ratio 2y:x of horizontal diameter x to vertical diameter 2y of the space formed by coupling between the container part 120 and the cap part 110 may be from 1.005 to 1.080. This ratio makes the space formed by coupling between the container part 120 and the cap part 110 have an ellipsoidal shape rather than a complete spherical shape. In this case, a portion applied with a pressure when ice cream is separated from the container part 120 may have a slight slope between a surface of the ice cream and a pressure-applied direction, which makes it easy to separate the ice cream. If the ratio 2y:x of horizontal diameter x to vertical diameter 2y is smaller than 1.005, the ice cream may not be easily separated from the container part, and if the ratio 2y:x of horizontal diameter x to vertical diameter 2y is greater than 1.080, a shape of the ice cream may be far from a spherical shape.

The first coupling flange 112 formed on the cap part 110 may be extended and formed in a circumferential direction and then bent and extended in a vertical direction to form a step. The number of steps can be regulated depending on the degree of coupling between the cap part 110 and the container part 120. The ice cream inlet 111 may be formed on an upper surface of the cap part 110, and, thus, a liquid ice cream material can be introduced. The ice cream inlet 111 is used when ice cream is made by quenching in the ice cream container 100 and thus may not be formed when the made ice cream is packaged. In this case, it is also possible to put and package ice cream, which is previously made to be suitable for an ice cream container, in the ice cream container according to the present disclosure. A first grip portion 113 may be formed on the first coupling flange 112. The first grip portion 113 may be formed into various shapes and may have various shapes of anti-slip protrusions on a surface of the first grip portion 113, and the first grip portion 113 may include a first grip hole 114 and thus can be coupled to a second grip portion 123 of the container part 120 to form a through hole.

Basically, the container part 120 may be formed symmetrically to the cap part 110 except the ice cream inlet 111. The container part 120 may have the second coupling flange 122 in a circumferential direction to be coupled to the first coupling flange 112 in a stationary fit manner. A shape of the second coupling flange 122 may be implemented in various ways and may have one or more steps like the first coupling flange 112. Like the cap part 110, the second coupling flange 122 may have the second grip portion 123 on its one side. The second grip portion 123 may be formed at a position to be in contact with the first grip portion 113 and may have various shapes of anti-slip protrusions on a surface exposed to the outside, and the second grip portion 123 may include a second grip hole 124 and thus can be coupled to the first grip portion 113 of the cap part 110 to form a through hole.

The first grip portion 113 and the second grip portion 123 make it easy to separate the cap part 110 and the container part 120 of the ice cream container 100 using the principle of levers and keep an ice cream surface in contact with the cap part 110 and the container part 120 away from direct grip with hands to suppress melting of the ice cream caused by heat from the hands or deformation of the ice cream caused by pressure from the hands. Particularly, in order to easily widen the gap between cap part 110 and the container part 120 when separating them, the first grip portion 113 and the second grip portion 123 may be formed to have different sizes so as not to be overlapped with each other.

Further, when a pressure is applied to separate ice cream, the step provides a space between an outer surface of the container part in direct contact with the ice cream and a user's hand and thus minimizes melting of ice cream caused by body heat and enables the user to separate the ice cream without contact with a cold portion. The step may be formed throughout the cap part and the container part or may be formed only in a portion of the cap part and the container part.

In addition to the above-described shape, the use of a material having a predetermined elasticity is one of the key elements of the present disclosure. It is important that the material have a predetermined elasticity, so that the container is not easily crushed but can maintain its shape under external pressure and can be generally changed in shape without being partially crushed when the coupling flanges 112 and 122 on the periphery are pressed with pressure. There are various materials which can be used for ice cream container, and a plastic material is typically used for ice cream container. In this case, examples of the plastic material may include polypropylene, polyethylene, polystyrene, and the like, and in the present disclosure, a material obtained by mixing polyethylene terephthalate (PET) and silicone resin is used as a material for ice cream container. In this case, an ice cream container can be manufactured in various ways, and in the present exemplary embodiment, the ice cream container was manufactured by mixing polyethylene terephthalate (PET) and silicone resin followed by injection molding.

Desirably, the material used in the present disclosure may contain polyethylene terephthalate (PET) in the amount of from 65 wt % to 95 wt % and silicon resin in the amount of from 5 wt % to 35 wt %. The amount of polyethylene terephthalate (PET) may vary depending on the amount of silicone, and the elasticity of the ice cream container may vary depending on the amount of silicone resin. If the amount of silicone resin is smaller than 5 wt %, the material does not have a sufficient elasticity and becomes hard, and, thus, when pressure is applied, the ice cream container cannot be sufficiently deformed, and if the amount of resin is greater than 35 wt %, the material may become too soft, and, thus, the ice cream container can be easily deformed by external pressure and ice cream therein can also be deformed. The amount of silicone may be more desirably in the range of from 10 wt % to 30 wt % and most desirably about 20 wt %.

Further, the thickness of the ice cream container according to the present disclosure may be desirably in the range of from 0.3 mm to 0.6 mm. In the present disclosure, the thickness of the ice cream container is associated with thermal conductivity and the degree of deformation of the container. In the case where the container has a low thermal conductivity and the quenching time of ice cream is increased, ice cream melted on its surface may be crystalized during refreezing. Meanwhile, in the case where the container has a high thermal conductivity, when the container is exposed to room temperature, a surface of ice cream may melt down before being eaten. Therefore, in the present disclosure, the thickness is limited to the above-described range to avoid these problems. If the thickness of the ice cream container is smaller than 0.3 mm, the ice cream container is very thin, and, thus, even when external pressure is slightly applied, an ice cream surface may be dented and may melt fast at room temperature. If the thickness of the ice cream container is greater than 0.6 mm, when the container part 120 and the cap part 110 are separated, the ice cream container is not deformed even by a predetermined pressure, and, thus, the container part 120 and the cap part 110 may not be readily separated and the quenching time may be increased, and, thus, crystallization caused by moisture contained in the ice cream may occur. The thickness of the ice cream container may be more desirably from 0.4 mm to 0.5 mm.

Figure 4:
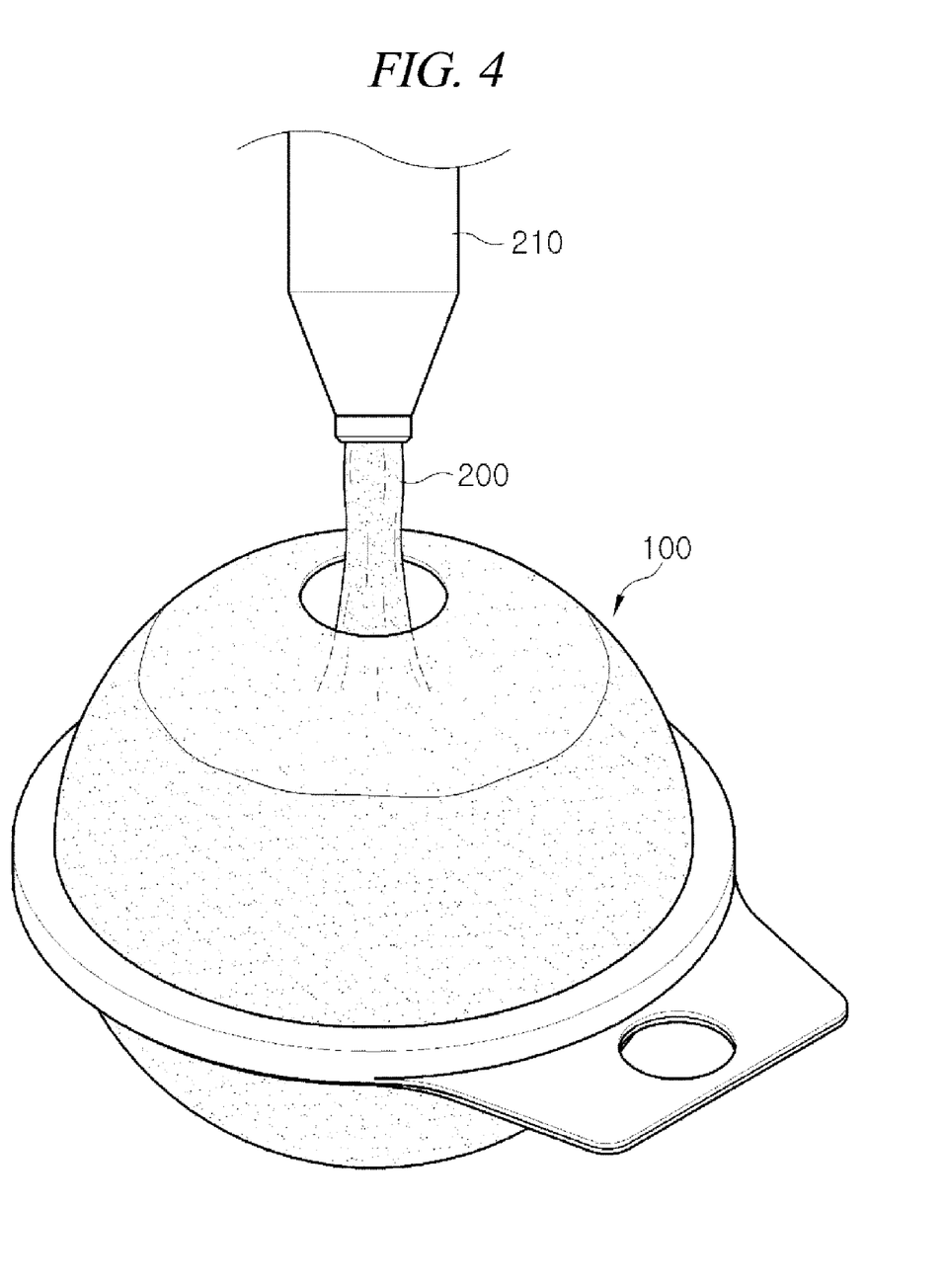
FIG. 4 is a diagram illustrating a process of filling the container for ice cream according to an exemplary embodiment of the present disclosure with a material.
Figure 5:
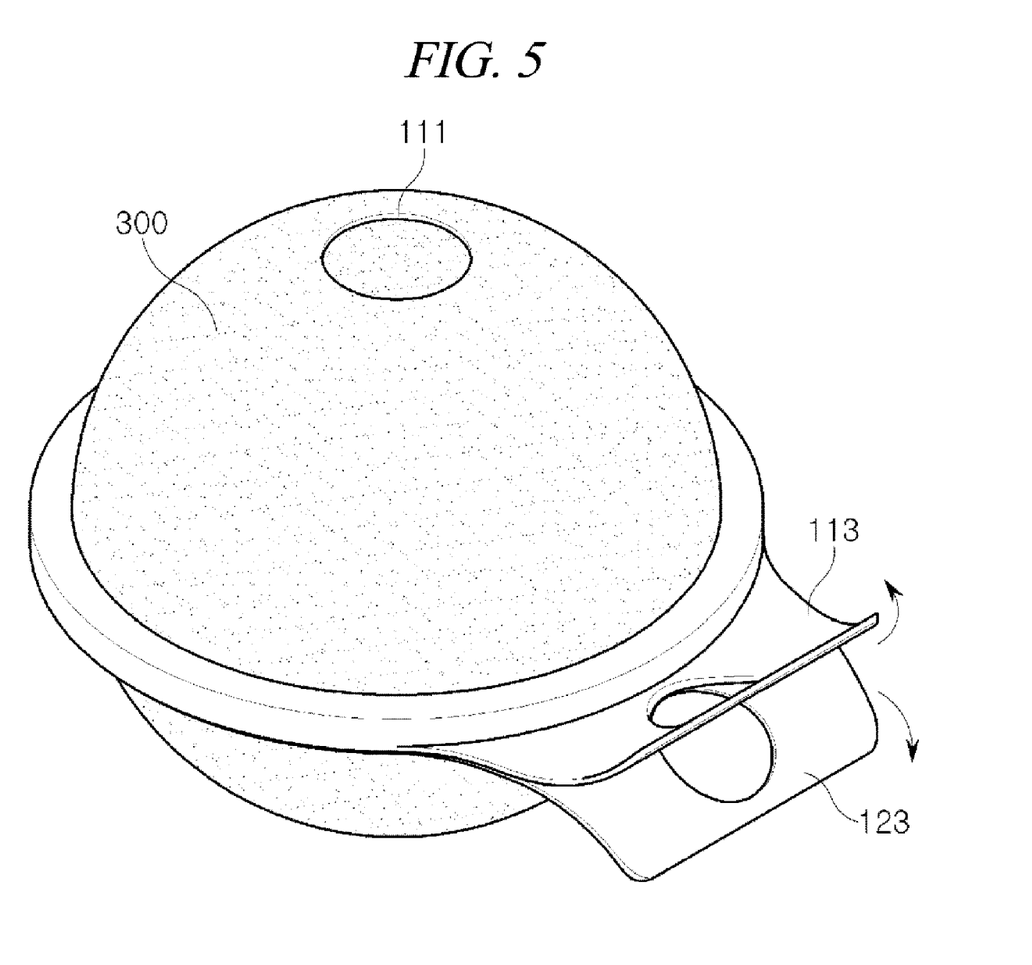
FIG. 5 is a diagram illustrating a process of separating a cap part and a container part of the container for ice cream according to an exemplary embodiment of the present disclosure.
Figure 6:
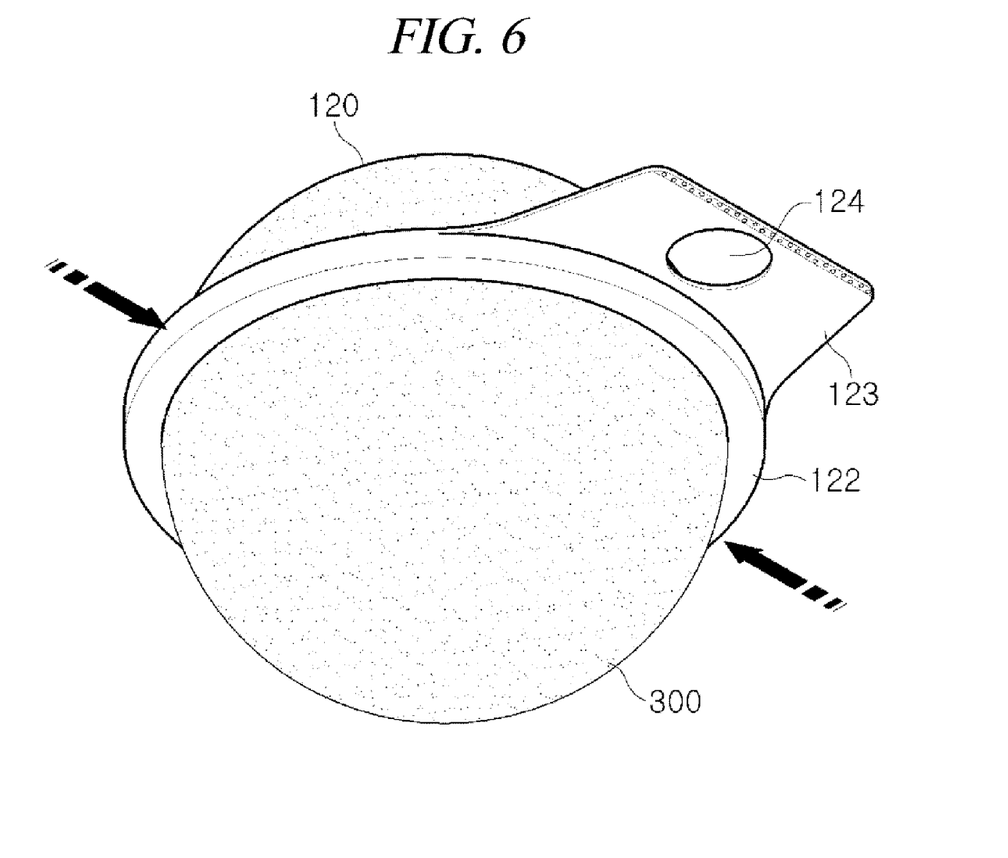
FIG. 6 is a diagram illustrating a process of separating ice cream from the container part of the container for ice cream according to an exemplary embodiment of the present disclosure.
Figure 7:
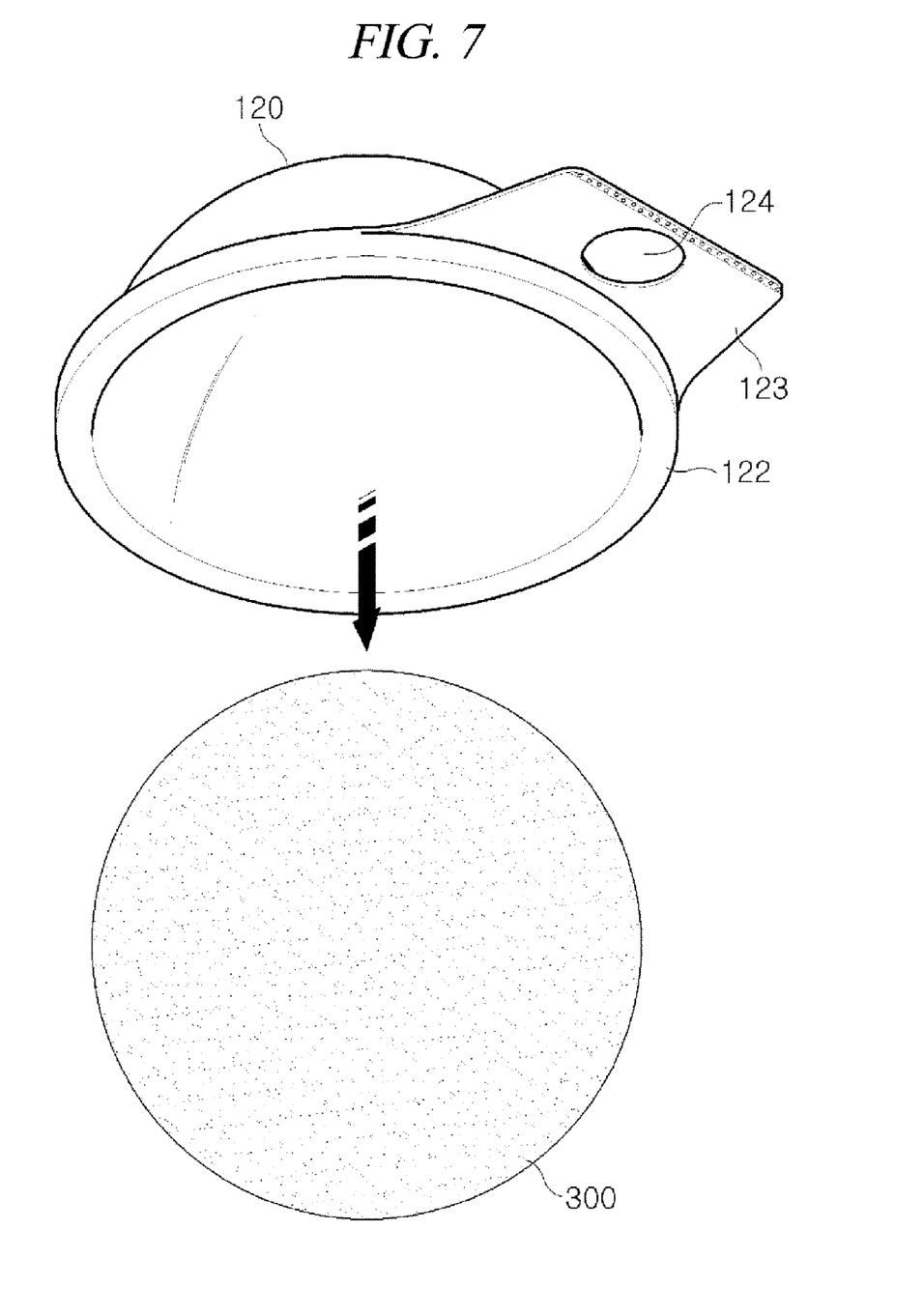
FIG. 7 is a diagram illustrating a status where ice cream is separated from the container for ice cream according to an exemplary embodiment of the present disclosure.

FIG. 4 is a diagram illustrating a process of filling the container for ice cream according to an exemplary embodiment of the present disclosure with a material. FIG. 5 is a diagram illustrating a process of separating a cap part and a container part of the container for ice cream according to an exemplary embodiment of the present disclosure. FIG. 6 is a diagram illustrating a process of separating ice cream from the container part of the container for ice cream according to an exemplary embodiment of the present disclosure. FIG. 7 is a diagram illustrating a status where ice cream is separated from the container for ice cream according to an exemplary embodiment of the present disclosure. An operational relationship in the ice cream container according to an exemplary embodiment of the present disclosure will be described with reference to FIG. 4 to FIG. 7.

Referring to FIG. 2 and FIG. 4, after the cap part 110 and the container part 120 are coupled by coupling of the first coupling flange 112 and the second coupling flange 122, an ice cream material 200 is introduced by a supply device 210 through the ice cream inlet 111 formed in the cap part 110. The ice cream material 200 is quenched after introduced, and, thus, it is possible to make spherical ice cream 300 within the ice cream container. After the ice cream is made, the ice cream is kept in a freezer and then may be transported to restaurants or coffee shops in need of ice cream. Referring to FIG. 2 and FIG. 5, when ice cream is provided, if the first grip portion 113 and the second grip portion 123 are widened and the first grip portion 113 is raised up while the second grip portion 123 is gripped, the first coupling flange 112 on the first grip portion 113's side is separated due to the principle of levers, and finally, the cap part 110 and the container part 120 can be separated from each other. If the cap part 110 is separated from the container part 120, the ice cream 300 is exposed to the outside, and if both sides of the second coupling flange 122 are pressed with pressure, the container part 120 is deformed with a predetermined elasticity, and, thus, the ice cream can be easily separated from the container part 120. Referring to FIG. 6 and FIG. 7, by pressing the second coupling flange 122, it is possible to suppress damage to a surface of the ice cream and also possible to easily separate the ice cream.

As such, if the ice cream container according to the present disclosure is used, there is an advantage of being able to easily separate ice cream without deformation of the ice cream. Particularly, if secondary ice cream products using ice cream, such as a cone of ice cream, a cup of ice cream, an affogato, and the like, are sold in a shop, the conventional problems of storage and sanitation which may occur when selling ice cream in bulk form can be solved. Particularly, as for ice cream in bulk, it is possible to suppress the deterioration in quality of the ice cream which occurs when the ice cream is frequently melted and frozen in a shop to take out a required amount of ice cream, and it is possible to more easily use ice cream, and, thus, the convenience of ice cream shops can be improved.

The degree of separation of packaging and the degree of being crushed of the ice cream container according to the present disclosure, the surface sanding on ice cream, the quenching time of ice cream, and the melting of contents were found through test examples. The surface sanding refers to the generation of moisture crystals on a surface by crystallization of moisture, and the quenching time refers to the time required for cooling at the time of making ice cream and the quenching time of 10 minutes or less was determined as good. Meanwhile, the melting of contents refers to melting of ice cream in a container when the container is left at room temperature for 30 seconds.

The test results for respective plastic materials were as shown in Table 1. The thickness of the materials used herein was set to 0.45 mm, and the amount of silicone in a composite material of PET and silicone resin was set to 20 wt %.

TABLE 1

| Material of container | Degree of separation of packaging | Whether crushed or not | Surface sanding | Quenching time | Melting of contents |
|---|---|---|---|---|---|
| PP | Medium | ◯ | X | Good | X |
| PE | High | X | X | Good | X |
| PS | Medium | ◯ | X | Good | X |
| PET + silicone | High | X | X | Good | X |

As shown in Table 1, it can be seen that a container formed using a composite material of PET and silicone shows excellent results for the respective items.

Meanwhile, the test results for respective thicknesses were as shown in Table 2. The material used herein was a composite material of PET and silicone resin, and the amount of silicone in the material was set to 20 wt %.

TABLE 2

| Thickness (mm) | Degree of separation of packaging | Whether crushed or not | Surface sanding | Quenching time | Melting of contents |
|---|---|---|---|---|---|
| 0.25 | High | ◯ | X | Good | ◯ |
| 0.3 | High | X | X | Good | X |
| 0.45 | High | X | X | Good | X |
| 0.6 | Medium | X | X | Good | X |
| 0.65 | Low | X | Partially occur | Slow | X |

As shown in Table 2, it can be seen that a container having a thickness of from 0.3 mm to 0.6 mm shows good results for the respective items.

Further, the test results for respective silicon contents were as shown in Table 3. The thickness of the material used herein was set to 0.45 mm.

TABLE 3

| Silicone content (wt %) | Degree of separation of packaging | Whether crushed or not | Surface sanding | Quenching time | Melting of contents |
|---|---|---|---|---|---|
| 0 | Low | X | X | ◯ | X |
| 10 | Medium | X | X | ◯ | X |
| 20 | High | X | X | ◯ | X |
| 30 | High | X | X | ◯ | X |

As shown in Table 3, it can be seen that a container having a silicon content in each range shows good results for the respective items, and a container which does not contain silicone has poor elasticity, and, thus, it is difficult to separate packaging.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

I claim:

1. A container for ice cream comprising a container part and a cap part,
    wherein an inner space, for storing ice cream, is formed by coupling the container part and the cap part,
    wherein the container part is formed of a material obtained by mixing polyethylene terephthalate (PET) and silicone resin in order to provide elasticity, and has a first coupling flange formed on the periphery thereof and a first grip portion formed on one side thereof,
    wherein the cap part has a second coupling flange corresponding to the first coupling flange, and has a second grip portion corresponding to the first grip portion and thus corresponds to the container part,
    wherein a ratio of a horizontal diameter to a vertical diameter of the inner space is from 1.005 to 1.080, and
    wherein the material forming the container includes the PET in an amount of from 70 wt % to 80 wt % and silicone resin in an amount of from 20 wt % to 30 wt %, and has a thickness of from 0.3 mm to 0.45 mm.

2. The container for ice cream of claim 1,
    wherein the first grip portion and the second grip portion include a first grip hole and a second grip hole, respectively, to form a through hole by the coupling between the container part and the cap part.

3. The container for ice cream of claim 1,
    wherein each of the container part and the cap part has a substantial hemispherical shape in order for the inner space formed by the coupling between the container part and the cap part to have a substantial spherical shape.

4. The container for ice cream of claim 1,
    wherein a step is formed on the first coupling flange and the second coupling flange.

\* \* \* \* \*